(12) United States Patent
Suzuki

(10) Patent No.: US 6,220,522 B1
(45) Date of Patent: Apr. 24, 2001

(54) INTERNAL COMBUSTION ENGINE HAVING COMBUSTION HEATER

(75) Inventor: Makoto Suzuki, Mishima (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/264,474

(22) Filed: Mar. 8, 1999

(30) Foreign Application Priority Data

| Mar. 10, 1998 | (JP) | 10-058695 |
| May 26, 1998 | (JP) | 10-144880 |
| Jul. 3, 1998 | (JP) | 10-189444 |

(51) Int. Cl.⁷ .................................................. B60H 1/02
(52) U.S. Cl. ..................................... 237/12.3 C; 237/12.1
(58) Field of Search ......................... 237/12.3 C, 12.3 R; 60/39.63; 123/3

(56) References Cited

U.S. PATENT DOCUMENTS

| 2,290,300 | 7/1942 | Spackman . |
| 3,526,214 | 9/1970 | Kamo .................................. 123/122 |

(List continued on next page.)

FOREIGN PATENT DOCUMENTS

| 4411959 | 10/1995 | (DE) . |
| 271999 | 6/1988 | (EP) . |
| 1497428 | 12/1967 | (FR) . |
| 2381175 | 9/1978 | (FR) . |
| 9902877 | 3/1999 | (FR) . |
| 2041081 | 9/1980 | (GB) . |
| 1595060 | 8/1981 | (GB) . |
| 60-224614A | 12/1985 | (JP) . |
| 62-75069 | 4/1987 | (JP) . |
| 62-99414 U | 6/1987 | (JP) . |
| 6-222360 | 8/1994 | (JP) . |
| 918466 | 4/1980 | (RU) . |

OTHER PUBLICATIONS

Patent Abstracts of Japan, vol. 018, No. 596 (P–1875), Nov. 14, 1994 & JP 06 222360 (Seiko Epson Corp.), Aug. 12, 1994.

(List continued on next page.)

*Primary Examiner*—Harold Joyce
*Assistant Examiner*—Derek S. Boles
(74) *Attorney, Agent, or Firm*—Kenyon & Kenyon

(57) ABSTRACT

An internal combustion engine having a combustion heater capable of simply preventing thermal damages to structures of intake system of the internal combustion engine, enhancing a starting characteristic of the engine in a low-temperature state, even when a compression ratio of the internal combustion engine is decreased, and speeding up of warming of an oil. The combustion heater is connected via a combustion gas introducing passageway to an intake pipe, whereby a combustion gas emitted from the combustion heater is introduced into the intake system via the combustion gas introducing passageway. In introducing the combustion gas, an exhaust gas cooler is arranged in the combustion gas introducing passageway for cooling off the combustion gas flowing therethrough. A bypass passageway is connected astride the exhaust gas cooler in bypass to the combustion gas introducing passageway. Also a passageway switching device is provided for guiding the combustion gas of the combustion heater to an engine body at the time of starting the engine when an outside air temperature is about 15° C. or below. The engine oil is warmed by the heat radiated from the exhaust gas cooler and received by the oil cooler.

9 Claims, 6 Drawing Sheets

U.S. PATENT DOCUMENTS

| | | | |
|---|---|---|---|
| 4,176,651 | 12/1979 | Backus | 123/27 GE |
| 4,212,162 | 7/1980 | Kobayashi . | |
| 4,836,445 | 6/1989 | Okada . | |
| 4,858,825 | 8/1989 | Kawamura . | |
| 5,377,440 | 1/1995 | Eller et al. | 431/11 |
| 5,402,757 | 4/1995 | Eller et al. | 123/179.21 |
| 5,641,016 | * 6/1997 | Isaji | 165/43 |

OTHER PUBLICATIONS

Co–pending Patent Appln. Serial No. 09/165,222, filed Oct. 1, 1998.

Co–pending Patent Appln. Serial No. 09/204,895, filed Dec. 3, 1998.

Co–pending Patent Appln. Serial No. 09/193,431, filed Nov. 17, 1998.

Patent Abstracts of of Japan, vol. 018, No. 600 (P–1826), Nov. 15, 1994 & JP 06 222867 A (Sharp Corp.), Aug. 12, 1994.

Patent Abstracts of Japan, vol. 005, No. 033 (M–057), Feb. 28, 1981 & JP 55 160158 A (Nissan Motor Co., Ltd.), Dec. 12, 1980.

* cited by examiner

INTERNAL COMBUSTION ENGINE HAVING COMBUSTION HEATER

BACKGROUND OF THE INVENTION

1. Field of the Invention

The present invention relates to an internal combustion engine having a combustion heater.

2. Description of the Prior Art

For example, Japanese Patent Application Laid-Open Publication No. 62-75069 discloses an art, in which an intake system of an internal combustion engine is provided with a combustion heater separately from an internal combustion engine body, raising a temperature of engine cooling water contained in a water jacket of the internal combustion engine by utilizing the combustion heat of the combustion heater, and thereby to attain the speeding up of warming the engine and enhancing a starting performance.

According to this art disclosed in the above Publication, the pipe is inserted into the water jacket of the internal combustion engine, and the combustion gas emitted from the combustion heater is allowed to flow into this pipe before starting up the engine. Then, the heat held by the combustion gas is thereby transmitted to the engine cooling water, and hence the temperature of the engine cooling water can be increased up to a desired temperature prescribed for each internal combustion engine by regulating a thermal quantity given to the engine cooling water.

"The desired temperature of the engine cooling water" implies a temperature enough to speed up the warm-up of the internal combustion engine and to enhance the starting characteristic thereof when the engine cooling water is warmed by the combustion heater and reaches this temperature.

It can be considered to enhance performances of a temperature raising mechanism for raising temperatures of the car room heater and of the internal combustion engine itself, and an intake air heating device and other temperature raising devices by raising a temperature of heat transmission fluid which is represented by the engine cooling water which has its temperature increased by the combustion heater as disclosed in the above Publication. In this case, in order to increase a heat exchange rate of the combustion heater to the heat transmission fluid, it may be sufficient to make a heat exchanging member of the combustion heater thin and elongate. In this instance, however, there might arise a problem that a water-flow resistance augments so that a flow rate to the temperature raising device is reduced or causes an increase of a drive loss of a pump for circulating the heat transmission fluid. Therefore, there must be naturally a limit for increasing the heat exchange rate. In such a case, since a sufficient heat exchange is not made, the temperature of the combustion gas of the combustion heater, which is introduced into the intake system of the internal combustion engine, inevitably becomes comparatively high. Hence, there might be caused thermal damages to the structures of the intake system.

Further, as demanded with times, decrease of a compression ratio of the internal combustion engine, namely, a low compression ratio, is required. However, this involves a problem that the starting characteristic of the internal combustion engine at a low temperature tends to decline.

Moreover, if trying to decrease the compression ratio of the internal combustion engine, the warm-up of the oil is delayed at the time of warming up the internal combustion engine because of a small exothermic quantity of the engine, resulting in such a problem that an engine friction becomes large and a fuel efficiency declines.

SUMMARY OF THE INVENTION

It is a primary object of the present invention, which was devised in view of the above-mentioned problems, to provide an internal combustion engine having a combustion heater capable of simply preventing thermal damages to the structures of the intake system and enhancing a low-temperature starting characteristic, even if a compression ratio of the internal combustion engine is decreased, by effectively utilizing the heat of a combustion gas of the combustion heater which is to be discharged into the intake system of the internal combustion engine, and capable of speeding up of warming of an oil even when the compression ratio of the internal combustion engine is decreased.

To accomplish the above object, according to a first aspect of the present invention, there is provided an internal combustion engine having a combustion heater which operates when the internal combustion engine is in a predetermined operating state, and enhancing a performance of a temperature raising device with a heat transmission fluid serving as a thermal source thereof, by warming the heat transmission fluid, and the internal combustion engine comprises: a combustion gas introducing passageway, through which the combustion heater is connected to an intake system of the internal combustion engine, for introducing a combustion gas emitted from the combustion heater into the intake system, and a cooling device for cooling the combustion gas flowing through the combustion gas introducing passageway.

Herein, "the time when the internal combustion engine is in the predetermined operating state" means that, at a cold time or at an extremely cold time, the internal combustion engine is being operated, or after starting the internal combustion engine, or when an exothermic quantity of the internal combustion engine itself is small (for example, when a fuel consumption is small) and when a heat quantity received by the engine cooling water is thereby small. Then, the cold time is a time when an outside air temperature is from about −10° C. to about 15° C., and the extremely cold time is a time when the outside air temperature is about −10° C. or lower.

The term "the heat transmission fluid" is referred to, for example, the engine cooling water.

Any sorts of "temperature raising devices" may be used on condition that these devices operate with the heat transmission fluid serving as a thermal source, for example, a device for speeding up the warm up of the internal combustion engine itself, or an intake air heating device for warming the intake air of the internal combustion engine, may be used. "The means for speeding up the warm-up of the internal combustion engine itself" implies a passageway for introducing the heat transmission fluid into the internal combustion engine, or a water jacket inside the internal combustion engine body. "The intake air heating device" is disposed in an intake passageway and functions therein as a heat exchanging unit.

For "the intake system of the internal combustion engine", an intake pipe is suitable.

For "the cooling device", it is preferable to use, for example, an exhaust gas cooler.

In the internal combustion engine having the combustion heater according to the present invention, the heat transmission fluid is warmed by the combustion heater, and the thus warmed heat transmission fluid serves to enhance the performance of the temperature raising device. Accordingly, the internal combustion engine having the combustion heater according to the present invention is capable of attaining a more enhanced performance of the temperature raising device than by the internal combustion engine not having the combustion heater.

Further, the combustion gas arriving at the internal combustion engine via the combustion gas introducing passageway from the combustion heater, is a gas after releasing the heat to the heat transmission fluid serving as the thermal source of the temperature raising device. Hence, the temperature of the combustion gas is no longer high, and, the combustion gas is further cooled off by the cooling device, and, therefore, there are no thermal damages to the structures of the intake system.

Moreover, the prevention of the thermal damages to the structure of the intake system can be effected simply by providing the cooling device, so that the manufacturing work is simplified and the productivity of the internal combustion engine having the combustion heater is consequently increased.

According to a second aspect of the present invention, in the internal combustion engine having the combustion heater according to the first aspect of the invention, the temperature raising device may be a car room heater for raising a temperature in a room of a vehicle.

According to a third aspect of the present invention, in the internal combustion engine having the combustion heater according to the first aspect of the invention, it is preferable that the heat transmission fluid is the engine cooling water.

According to a fourth aspect of the present invention, in the internal combustion engine having the combustion heater according to the third aspect of the invention, it is preferable that the cooling device cools off the combustion gas by radiating the heat held by the combustion gas to the engine cooling water. For "the cooling device", an exhaust gas cooler is preferable. A preferable exhaust gas cooler is constructed to include therein an engine cooling water passageway through which the engine cooling water flows, and the combustion gas introducing passageway is brought into contact with this engine cooling water passageway, whereby the heat held by the combustion gas is released to the engine cooling water. Then, what is desirable as the cooling device is the one capable of continuously cooling, with the engine cooling water, the combustion gas flowing through the combustion introducing passageway by repeatedly supplying the cooling device with the engine cooling water of the water jacket of the internal combustion engine, which is connected to the engine cooling water passageway. When the combustion gas is cooled off by the engine cooling water, the heat held by the combustion gas is transferred to the engine cooling water, thereby increasing the temperature of the engine cooling water.

According to a fifth aspect of the present invention, in the internal combustion engine having the combustion heater according to the third aspect of the invention, the cooling device may be adapted to transmit the heat of the combustion gas of the combustion heater to the engine cooling water via an external wall of the body of the internal combustion engine.

According to a sixth aspect of the present invention, the internal combustion engine having the combustion heater according to the first aspect of the invention, may further comprise a bypass passageway which is connected in bypass to the combustion gas introducing passageway with respect to the cooling device, and a passageway switching device for guiding the combustion gas of the combustion heater to the internal combustion engine body via the bypass passageway at the time of starting the internal combustion engine when the internal combustion engine is in the predetermined operating state.

Herein, it is preferable that "the passageway switching device" is constructed of a valve member for closing an opening of the bypass passageway, and of a rotary shaft of this valve member, and that this switching device opens the opening of the bypass passageway by the valve member's rotation about the rotary shaft at the time of starting the internal combustion engine.

Since the present invention is structured as described above, at least at the time of starting the internal combustion engine, the combustion gas of the combustion heater, steering clear of the cooling device, arrives at the internal combustion engine body via the bypass passageway, and is therefore in the as-warmed state where the combustion gas is not cooled by the cooling device. Accordingly, it is feasible to enhance the starting characteristic of the internal combustion engine at the time of starting the internal combustion engine, in other words, when the internal combustion engine is in the low-temperature state where it is not yet warmed up. As a result, the compression ratio can be decreased.

According to a seventh aspect of the present invention, the internal combustion engine having the combustion heater according to the fourth aspect of the invention, preferably further comprises a heat exchanging device for transmitting the heat received by the engine cooling water from the cooling device to a lubricating oil of the internal combustion engine, and thereby transferring the heat held by the engine cooling water to the lubricating oil.

A preferable "heat exchanging devices" is the one structured to transmit the heat to the engine lubricating oil for warming up the lubricating oil at the time of warming the engine and where the engine lubricating oil is still cold. For example, the preferable heat exchanging device incorporates an engine cooling water passageway through which to flow the engine cooling water coming from the cooling device and in a heat receiving state, and a lubricating oil passageway brought into contact with this engine cooling water passageway and communicating with the oil passageway of the internal combustion engine body.

According to the present invention, the heat held by the engine cooling water is transmitted to the engine oil and thus warms up this oil. Therefore, delay of warm-up of the oil when warming the internal combustion engine can hardly occur even if the compression ratio of the internal combustion engine is decreased. Accordingly, the oil cooler nay be operated at the time of warming up the engine, in which state the engine lubricating oil is still cold, whereby the sufficient warm-up of the oil can be expected even when the temperature of the engine cooling water is low at the time of warming up the engine. Hence, the engine friction is decreased even at the time of starting up the engine, thereby improving the fuel efficiency of the internal combustion engine.

According to an eighth aspect of the present invention, in the internal combustion engine having the combustion heater according to the seventh aspect of the invention, it is desirable that the heat exchanging device is disposed in a circulation passageway for connecting the cooling device to a water jacket of the internal combustion engine, at a position downstream of the cooling device.

According to a ninth aspect of the present invention, in the internal combustion engine having the combustion heater according to the eighth aspect of the invention, it is preferable that the heat exchanging device is an oil cooler.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Embodiments of the present invention will hereinafter be described with reference to the accompanying drawings.

First Embodiment (Engine 1)

Figure 1:
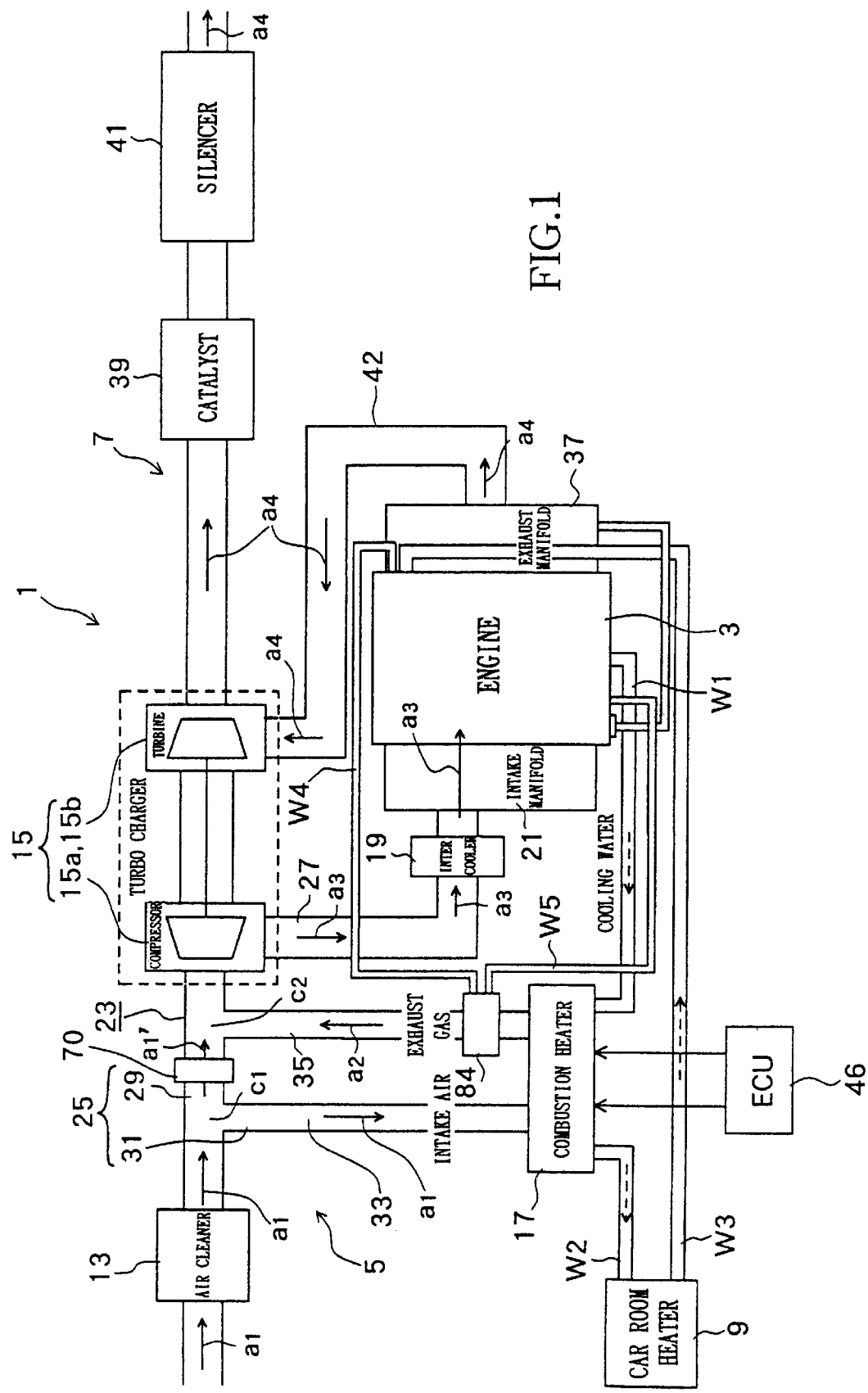
FIG. 1 is a schematic diagram showing an internal combustion engine having a combustion heater in a first embodiment of the present invention.

An engine 1 is a water cooling type internal combustion engine, and includes, as shown in FIG. 1, an engine body 3 having an unillustrated water jacket through which the engine cooling water is circulated, an air intake device 5 for supplying a plurality of unillustrated cylinders of the engine body 3 with the air needed for combustion, an exhaust device 7 for discharging into the atmospheric air an exhaust gas produced after an air-fuel mixture has been burned in the cylinders, and a car room heater 9 for warming the interior of a room of a vehicle mounted with the engine 1.

(Air Intake Device 5)

The air intake device 5 structurally starts with an air cleaner 13 as a filter and terminates with an unillustrated intake port of the engine body 3. From the air cleaner 13 down to the intake port, the air intake device 5 is provided with a compressor 15a of a turbo charger 15, a combustion heater 17, an inter cooler 19, and an intake manifold 21, all of which are structures constituting an intake system.

These structures of the intake system belong to an intake pipe 23 having a plurality of connecting pipes.

(Intake Pipe 23)

The intake pipe 23 is branched at the compressor 15a as a boundary into a downstream-side connecting pipe 27 which is brought into a pressurized state because of the outside air entering the air intake device 5 being forcibly intruded by the compressor 15a, and an upstream-side connecting pipe 25 not brought into the pressurized state.

Referring to FIG. 1, the upstream-side connecting pipe 25 is constructed of a rod-like mainstream pipe 29 extending straight from the air cleaner 13 toward the compressor 15a, and a branch pipe 31 for the heater as a tributary pipe connected in bypass to the mainstream pipe 29.

(Branch Pipe 31 for the Heater)

The branch pipe 31 for the heater taking substantially a U-shape as a whole and embraces the combustion heater 17 disposed at the center portion of this pipe 31. Further, the branch pipe 31 for the heater has an air supply passageway 33 disposed upstream of the combustion heater 17 in an air flowing direction in the branch pipe 31 for the heater, and likewise a combustion gas introducing passageway 35 disposed downstream of the combustion heater 17.

(Air Supply Passageway 33)

The air supply passageway 33 connects the combustion heater 17 to the mainstream pipe 29 and supplies the combustion heater 17 with fresh air a1 via the mainstream pipe 29. The combustion gas introducing passageway 35 connects the combustion heater 17 to the mainstream pipe 29 and introduces, into the mainstream pipe 29, a combustion gas a2 emitted from the combustion heater 17. Hence, the air related to the branch pipe 31 for the heater may include both of the fresh air a1 and the combustion gas a2 from the combustion heater 17.

(Combustion Gas Introducing Passageway 35)

Further, the combustion gas introducing passageway 35 also transmits the heat (combustion heat) held by the combustion gas a2 since the combustion gas a2 flows therethrough. Then, an exhaust gas cooler 84 serving as a cooling device is attached to the combustion gas introducing passageway 35 at a portion closer to the combustion heater 17.

(Exhaust Gas Cooler 84)

Figure 2:
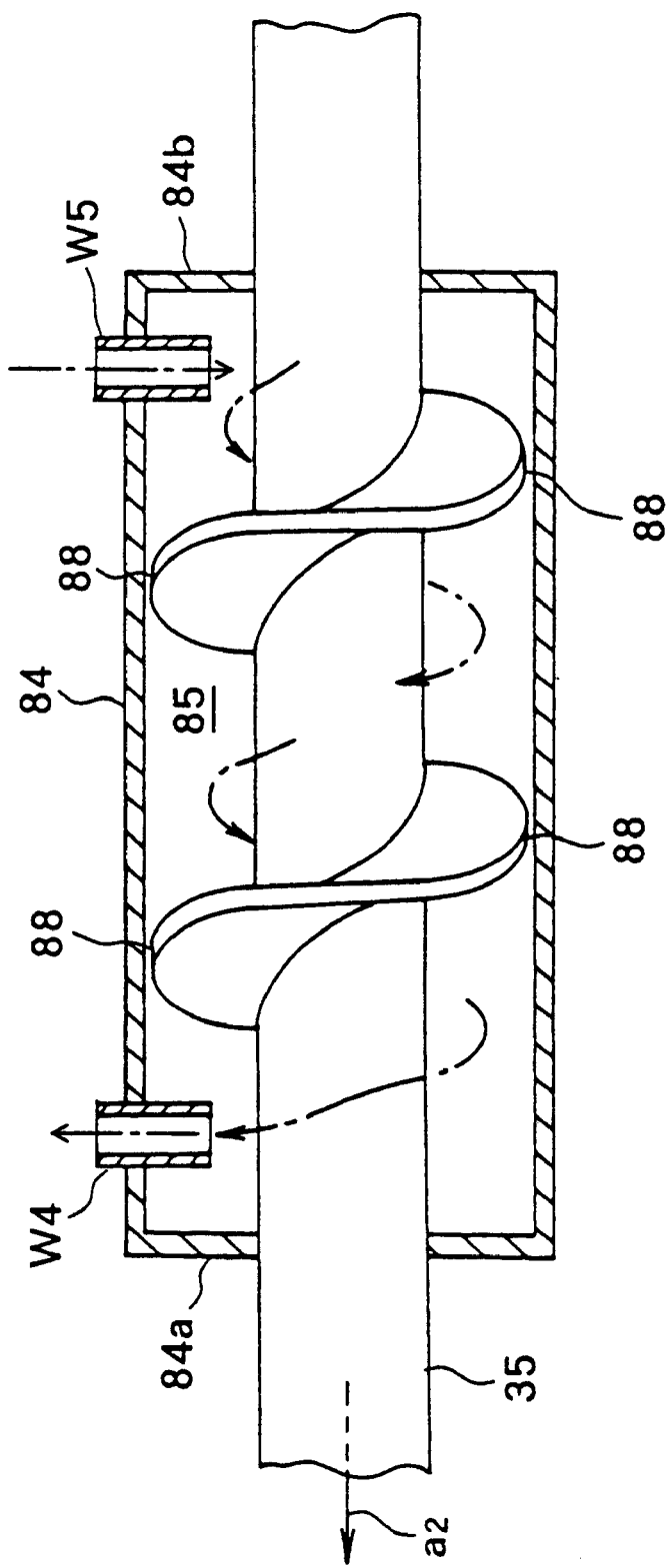
FIG. 2 is an enlarged sectional view of an exhaust gas cooler.

The exhaust gas cooler 84 has, as illustrated in FIG. 2, a helical water passageway 85. A cylindrical housing 86, having its ends closed and a diameter slightly larger than that of the combustion gas introducing passageway 35, is fitted externally over the combustion gas introducing passageway 35, and a plurality of fins 88, 88, . . . are spirally secured to an external wall surface of the combustion gas introducing passageway 35, thus forming the helical water passageway 85.

Water conduits W4, W5 are fitted to both ends 84a, 84b of the exhaust gas cooler 84, and the engine cooling water enters the cylindrical housing 86 via the water conduit W5 and flows out of the water conduit W4 along the outer surface of the combustion gas introducing passageway 35. Further, as it is understood from FIG. 1, the water conduits W4, W5 on the opposite side to the cylindrical housing 86 communicate with the water jacket of the engine body 3.

The exhaust gas cooler 84 is thus structured, and, therefore, the engine cooling water from the water jacket is circulated between the exhaust gas cooler 84 and the water jacket via the water conduits W4, W5. Then, the engine cooling water arrives at the exhaust gas cooler 84 via the water conduit W5 from the water jacket, upon which the engine cooling water flows as it is guided along the helical water passageway 85 around the outer wall of the combustion gas introducing passageway 35, whereby the exhaust gas cooler 84 is brought into the operating state. Further, at this time, if the combustion gas a2 also flows through the combustion gas introducing passageway 35, the combustion gas a2 is cooled off by the exhaust gas cooler 84, and, therefore, the heat held by the combustion gas a2 lowers. Hence, the combustion gas entering the mainstream pipe 29 via the combustion gas introducing passageway 35 turns out to be a low-temperature gas.

Further, with respect to connecting points c1, c2 respectively connecting the air supply passageway 33 to the mainstream pipe 29 and connecting the combustion gas introducing passageway 35 to the mainstream pipe 29, the connecting point c1 is disposed more upstream of the mainstream pipe 29 than the connecting point c2. Therefore, the air a1 from the air cleaner 13 is separated into the air a1 diverging at the connecting point c1 to the branch pipe 31 for the beater, and air a1' flowing toward the connecting point c2 through the mainstream pipe 29 without diverging. The air a2, which has turned out from the air a1 to be the combustion gas of the combustion heater 17 upon its being burned in the combustion heater 17 after diverging at the connecting point c1, becomes confluent with the air a1' at the connecting point c2, and turns out to be a combustion gas mixed air a3. This combustion gas mixed air a3 is the intake air entering the engine body 3. The air a3 contains the combustion gas a2 of the combustion heater 17, but the combustion gas a2 of the combustion heater 17 emits almost no smoke, in other words, does not contain carbon. Hence, there must be no trouble in using the combustion gas a2 as the intake air for the internal combustion engine.

(Downstream-side Connecting Pipe 27)

Referring to FIG. 1, the downstream-side connecting pipe 27 is a pipe for connecting the compressor 15a to the intake manifold 21, and takes substantially an L-shape as to the one shown in FIG. 1. Further, the inter cooler 19 is disposed on the downstream-side connecting pipe 27 at a position closer to the intake manifold 21.

(Exhaust Device 7)

On the other hand, the exhaust device 7 structurally starts with an unillustrated exhaust port of the engine body 3 and terminates with a silencer 41. From the exhaust port down to the silencer 41, the exhaust device 7 is provided with an exhaust manifold 37, a turbine 15b of the turbo charger 15 and an exhaust gas catalyst 39 along an exhaust pipe 42. These components are well known and are not related directly to the present invention, so that the description thereof is omitted. The air flowing through the exhaust device 7 is designated by the symbol a4 as an exhaust gas of the engine 1.

(Combustion Heater 17)

Figure 3:
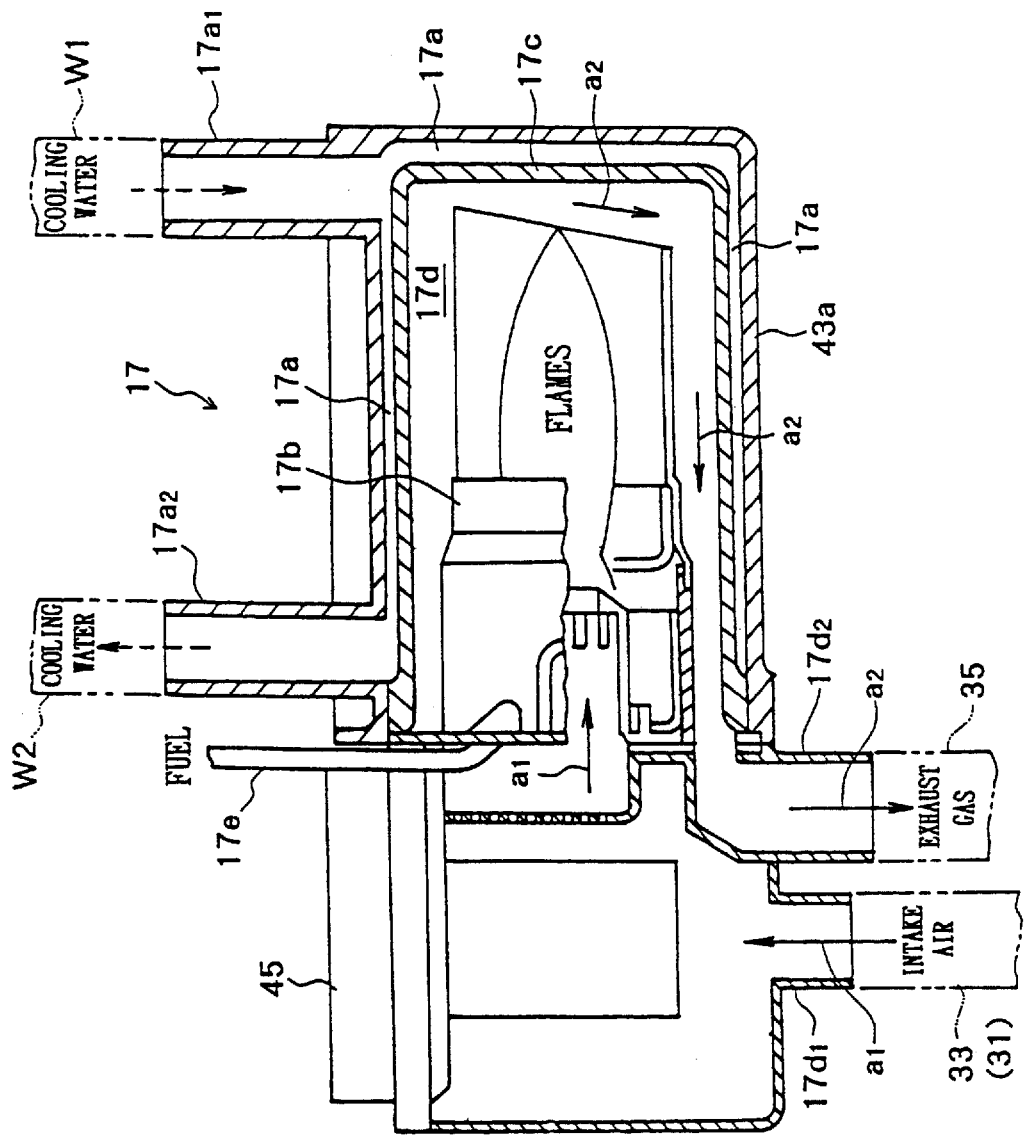
FIG. 3 is a schematic sectional view of a combustion heater.

Next, a structure of the combustion heater 17 is schematically shown in FIG. 3.

The combustion heater 17 operates when an outside air temperature is about 15° C. or lower. Further, the combustion heater 17 is connected to the water jacket of the engine body 3 and includes a cooling water passageway 17a through which to flow the cooling water from the water jacket thereinto. The engine cooling water (indicated by the broken line in FIG. 3) flowing through the cooling water passageway 17a passes through around a combustion chamber 17d formed inside the combustion heater 17, during which the cooling water receives the heat from the combustion chamber 17d and is thus warmed up. This process will be sequentially described in greater detail.

(Combustion Chamber 17d)

The combustion chamber 17d is constructed of a combustion cylinder 17b as a combustion source from which flames are emitted, and a cylindrical partition wall 17c for covering the combustion cylinder 17b to prevent the flames from leaking outside. The combustion cylinder 17b is covered with the partition wall 17c, whereby the combustion chamber 17d is defined by the partition wall 17c therein. Then, the partition wall 17c is also covered with an external wall 43a of the combustion heater 17, with a spacing therebetween. With this spacing, the cooling water passageway 17a is formed between an inner surface of the external wall 43a and an outer surface of the partition wall 17c.

Further, the combustion chamber 17d has an air supply port 17d1 and an exhaust gas discharge port 17d2, which are respectively connected directly to the air supply passageway 33 and the combustion gas introducing passageway 35. The air a1 supplied from the air supply passageway 33, upon entering the combustion chamber 17d via the air supply port 17d1, flows therethrough and arrives at the exhaust gas discharge port 17d2. Thereafter, as described above, the air a1 flows via the combustion gas introducing passageway 35 into, as the air a2, the mainstream pipe 29. Hence, the combustion chamber 17d takes the form of an air passageway that allows the air a1 to flows therethrough, to be burned in the combustion heater 17, and, thereafter changed to the air a2.

Then, the air a2 flowing back to the mainstream pipe 29 via the combustion gas introducing passageway 35 after being burned in the combustion heater 17, is, so to speak, an exhaust gas discharged from the combustion heater 17, and, therefore, holds the heat. Then, the air a2 holding the heat flows out of the combustion heater 17, during which the heat held by the air a2 is transmitted via the partition wall 17c to the engine cooling water flowing through the cooling water passageway 17a, thus warming up the engine cooling water up to a desired temperature predetermined according to the engine 1 as described above. Accordingly, the combustion chamber 17d serves also as a heat exchange passageway.

(Predetermined Desired Temperature)

Further, the predetermined desired temperature described above is a temperature enough to speed up of warming of the engine 1 and enhance the performance of the car room heater 9 for increasing a temperature in the car room of the vehicle mounted with the engine 1, when the engine cooling water is warmed up by the combustion heater 17 and reaches the predetermined temperature.

(Combustion Cylinder 17b)

The combustion cylinder 17b includes a fuel supply pipe 17e connected to an unillustrated fuel pump, and a fuel for combustion is supplied, under a pressure of the fuel pump, to the combustion cylinder 17b. The combustion fuel supplied is vaporized in the combustion heater 17, thereby becoming a vaporized fuel. This vaporized fuel is ignited by an unillustrated ignition source.

The air supply passageway 33 and the combustion gas introducing passageway 35 are used for only the combustion heater 17 and, therefore, they can be said members belonging to the combustion heater 17.

(Circulation of Engine Cooling Water)

Next, a circulation of the engine cooling water through the cooling water passageway 17a will be described.

(Cooling Water Passageway 17a)

The cooling water passageway 17a has a cooling water intake port 17a1 connected to the water jacket of the engine body 3, and a cooling water discharge port 17a2 connected to the car room heater 9.

The cooling water intake port 17a1 is connected via a water conduit W1 to the engine body 3, and the cooling water discharge port 17a2 is connected through a water conduit W2 to the car room heater 9.

The combustion heater 17 is connected via these water conduits W1, W2 to the water jacket of the engine body 3 and to the car room heater 9. Further, the car room heater 9 is connected via a water conduit W3 to the engine body 3.

Accordingly, the engine cooling water of the water jacket of the engine body 3 flows in the following order: (1) It flows from the cooling water intake port 17a1 through the water conduit W1 and arrives at the combustion heater 17 where it is warmed up. (2) The warmed engine cooling water flows from the cooling water discharge port 17a2 of the combustion heater 17 through the water conduit W2 and arrives at the car room heater 9. (3) The engine cooling water having its temperature lowered by the heat exchange in the car room heater 9 flows back to the water jacket via the water conduit W3. Even when the engine cooling water arrives at the water jacket, the heat still remaining in the engine cooling water is used for speeding up the warm-up of the engine 1.

Thus, the cooling water is circulated between the engine body 3, the combustion heater 17 and the car room heater 9 via the water conduits W1, W2, W3. Then, the combustion heater 17 warms the engine cooling water with the combustion gas thereof, thereby enhancing the performance of the car room heater 9 for raising the room temperature of the unillustrated vehicle mounted with the engine 1 and speeding up the warming of the engine 1.

In addition to those described above, an air blowing fan 45 is provided within a combustion chamber body 43.

(ECU 46)

The ECU 46 is electrically connected to the air blowing fan 45 and the fuel pump and also to a variety of sensors such as an unillustrated outside air temperature sensor and the like. Then, the combustion heater 17 operates in accordance with parameters of the variety of sensors such as the unillustrated outside air temperature sensor and the like, thereby to control a combustion state of the combustion heater 17. In other words, a force, a magnitude and a temperature of the flames of the combustion heater 17 are controlled, thereby a temperature of the exhaust gas (the combustion gas) of the combustion heater 17 is controlled.

(Airflow Meter 70)

Further, an airflow meter designated by 70 is provided between the connecting points c1, c2 of the mainstream pipe 29, at which points the air supply passageway 33 and the combustion gas introducing passageway 35 are respectively connected to the Mainstream pipe 29.

Generally, the airflow meter is regarded as an air resisting structure for hindering the flow of air flowing through the intake passageway, and, therefore, a pressure of the air exiting the airflow meter is lower than a pressure of the air entering the airflow meter. Namely, the airflow meter has a difference in the air pressure between an inlet side and an outlet side. Thus, when the airflow meter 70, which is the intake air resisting structure having the difference in the air pressure between inlet and outlet sides, is disposed at a portion of the mainstream pipe 29 where the air flow is diverged to flow to the combustion heater 17 in by pass to the mainstream pipe 29, specifically, at a portion of the mainstream pipe 29 between the connecting point c1 for connecting the air supply passageway 33 to the mainstream pipe 29 and the connecting point c2 for connecting the combustion gas introducing passageway 35 to the mainstream pipe 29, there is a great differential pressure between the points c1 and c2, namely, between the inlet of the air supply passageway 33 and the outlet of the combustion gas introducing passageway 35, and hence an air flow velocity in the combustion chamber 17d of the combustion heater 17 which is located between the air supply passageway 33 and the combustion gas introducing passageway 35, becomes excessive, with the result that an ignition characteristic of the combustion heater 17 might decline.

Thus, it is preferable that the airflow meter has a small differential pressure between the inlet side and outlet side, such as, for example, a hot-wire type or film type airflow.

The internal combustion engine 1 having the combustion heater described above is the first embodiment of the present invention.

(Operation and Effect of the First Embodiment)

With respect to the engine 1, the combustion heater 17 is connected via the combustion gas introducing passageway 35 to the mainstream pipe 29, whereby the combustion gas emitted from the combustion heater 17 is introduced into the mainstream pipe 29 via the combustion gas introducing passageway 35. Then, the combustion gas flowing through the combustion gas introducing passageway 35 is cooled off by the exhaust gas cooler 84. That is, even when the combustion gas a2 in a high-temperature is discharged from the combustion heater 17 to the combustion introducing passageway 35, the combustion gas a2 becomes a low-temperature combustion gas, since it is cooled off by the exhaust gas cooler 84. Accordingly, the combustion gas introduced into the mainstream pipe 29 via the exhaust gas cooler 84 does not exert any thermal damages to the structures of the intake system, namely, the compressor 15a of the turbo charger 15, the inter cooler 19 and the intake manifold 21.

Further, in order to prevent the thermal damages to these structures of the intake system, it is sufficient to provide the combustion gas introducing passageway 35 with the exhaust gas cooler 84, and hence the manufacturing work is simplified. Accordingly, a productivity of the internal combustion engine 1 having the combustion heater increases.

Second Embodiment

Figure 4:
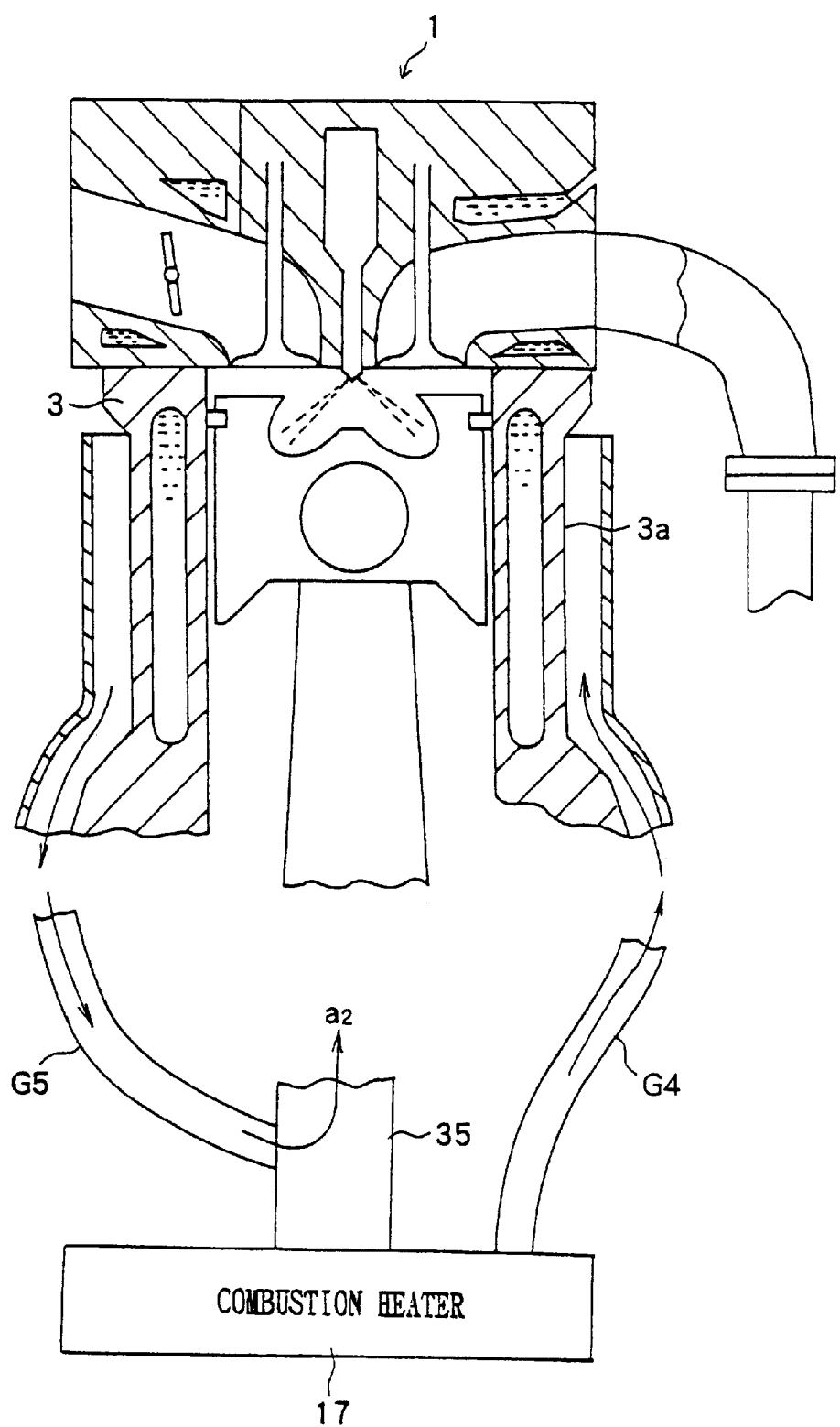
FIG. 4 is an enlarged view of a principal portion of the internal combustion engine having the combustion heater in a second embodiment.

In the first embodiment, there has been exemplified the construction in which the heat held by the combustion gas of the combustion heater 17 is radiated to the engine cooling water of the water jacket through the water conduits W4, W5 belonging to the exhaust gas cooler 84. However, as illustrated in FIG. 4, in a second embodiment, the exhaust gas cooler 84 and the water conduits W4, W5 are eliminated, and, instead, there are provided a gas conduit G4 for connecting the combustion heater 17 to an external wall 3a of the engine body 3, and a gas conduit G5 for connecting the external wall 3a of the engine body 3 to the combustion gas introducing passageway 35, whereby the heat of the combustion gas can be also radiated. In this case, the combustion gas emitted from the gas combustion heater 17 is guided around the external wall 3a of the engine body 3 through the gas conduit G4 and thus flowed around the external wall 3a of the engine body 3.

(Operation and Effect of the Second Embodiment)

In the second embodiment, the heat of the combustion gas of the combustion heater 17 is radiated to the engine cooling water of the water jacket through the gas conduit G4, and thereafter the heat-radiated combustion gas is collected into the combustion gas introducing passageway 35 through the gas conduit G5. In this manner, the heat of the combustion gas outputted from the combustion heater 17 can be transmitted to the engine cooling water in the water jacket through the external wall 3a. Accordingly, the only difference from the first embodiment is the way of radiating the heat held by the combustion gas of the combustion heater 17, and the same operation and effect as that of the first embodiment can be attained by the second embodiment.

Third Embodiment

Figure 5:
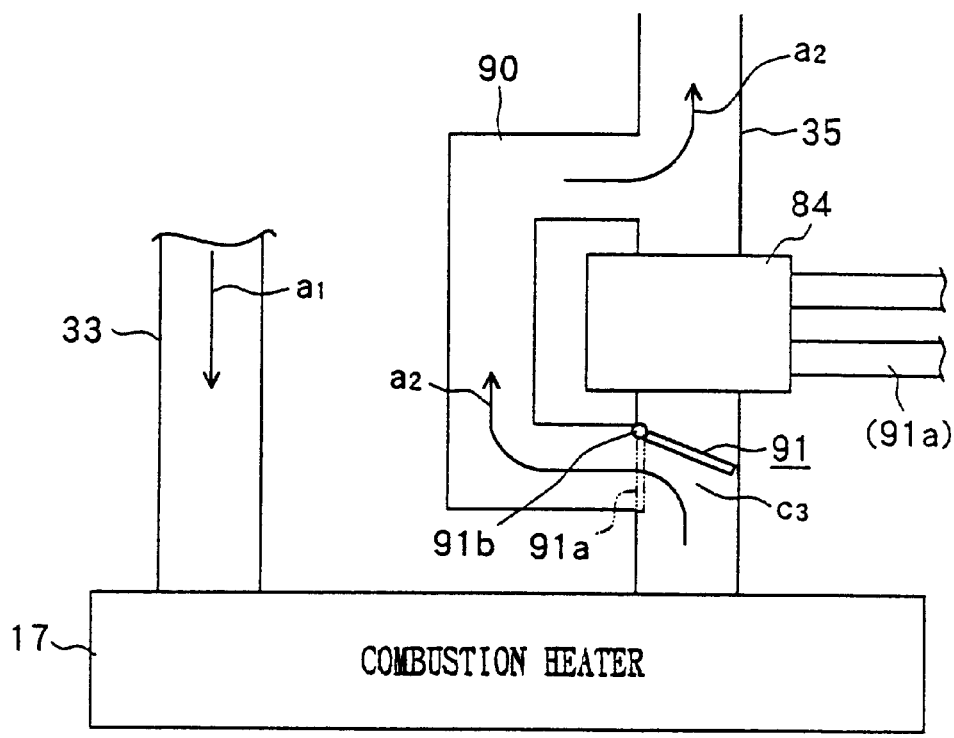
FIG. 5 is an enlarged view of a principal portion of the internal combustion engine having the combustion heater in a third embodiment.

A third embodiment is described by referring to FIG. 5.

A difference of the third embodiment from the first embodiment is that the combustion gas introducing passageway 35 includes a bypass passageway 90 connected in by pass to the exhaust cooler 84 and that, in the case of starting the engine 1 when the outside air temperature is as low as 15° C. or below, the combustion gas of the combustion heater 17 is guided via the bypass passageway 90 to the engine body 3, steering clear of the exhaust cooler 84. Therefore, the same components as those described in the preceding embodiments are marked with the like reference symbols, and the description thereof is omitted.

(Bypass Passageway 90)

The bypass passageway 90 is substantially in a C-shape, as shown in FIG. 5, and connected astride the exhaust gas cooler 84 in bypass to the combustion gas introducing passageway 35.

Further, a passageway switching device 91 is provided at a connecting portion c3, where the bypass passageway 90 is connected to the combustion gas introducing passageway 35, at an upstream open end located more upstream than the other open end of the bypass passageway 90.

(Passageway Switching Device 91)

The passageway switching device 91 is constructed of a valve member 91a and a rotary shaft 91b thereof. The valve member 91a is so controlled by the ECU as to be opened or closed with respect to the upstream open end of the bypass passageway 90. With this arrangement, the combustion gas emitted from the gas combustion heater 17 is allowed to flow or inhibited from flowing to the bypass passageway 90.

More specifically, at a cold time and at starting the engine, the valve member 91a is positioned as indicated by the solid line in FIG. 5 to open the bypass passageway 90, whereby the combustion gas a2 of the combustion heater 17 is led to the bypass passageway 90. Then, after the lapse of a short period of time after starting the engine, the valve member 91a is positioned as indicated by the two-dotted line in FIG. 5 to close the bypass passageway 90, thereby inhibiting the combustion gas of the combustion heater 17 from entering the bypass passageway 90.

Note that the valve member 91a is brought into the closed state as described above when the ECU judges that the engine 1 is sufficiently warmed up based on a value detected by, for example, an unillustrated engine cooling water temperature detecting sensor. A judging method by the ECU is not related to the gist of the present invention, and its description is therefore omitted.

(Operation and Effect of the Third Embodiment)

The third embodiment provides the following operation and effect in addition to the same operation and effect as that of the first embodiment.

When the engine 1 is started, at least at the cold time, the combustion gas of the combustion heater 17 flows through the bypass passageway 90, steering clear of the exhaust cooler 84, and arrives at the engine body 3, and, therefore it is an as-warmed gas without being cooled by the exhaust gas cooler 84. Accordingly, it is feasible to enhance the starting characteristic of the engine 1 at the time of starting the engine 1, even in the low-temperature state where the engine 1 is not yet sufficiently warmed up. Hence, a compression ratio of the engine 1 can be decreased.

By contrast, when the engine 1 is sufficiently warmed up, the combustion gas of the combustion heater 17 passes through the exhaust cooler 84 this time and, after being cooled once, arrives at the engine body 3. Consequently, the intake air temperature does not become too high, and hence there is no possibility of exerting the thermal damages to the structures of the intake system.

Fourth Embodiment

Figure 6:
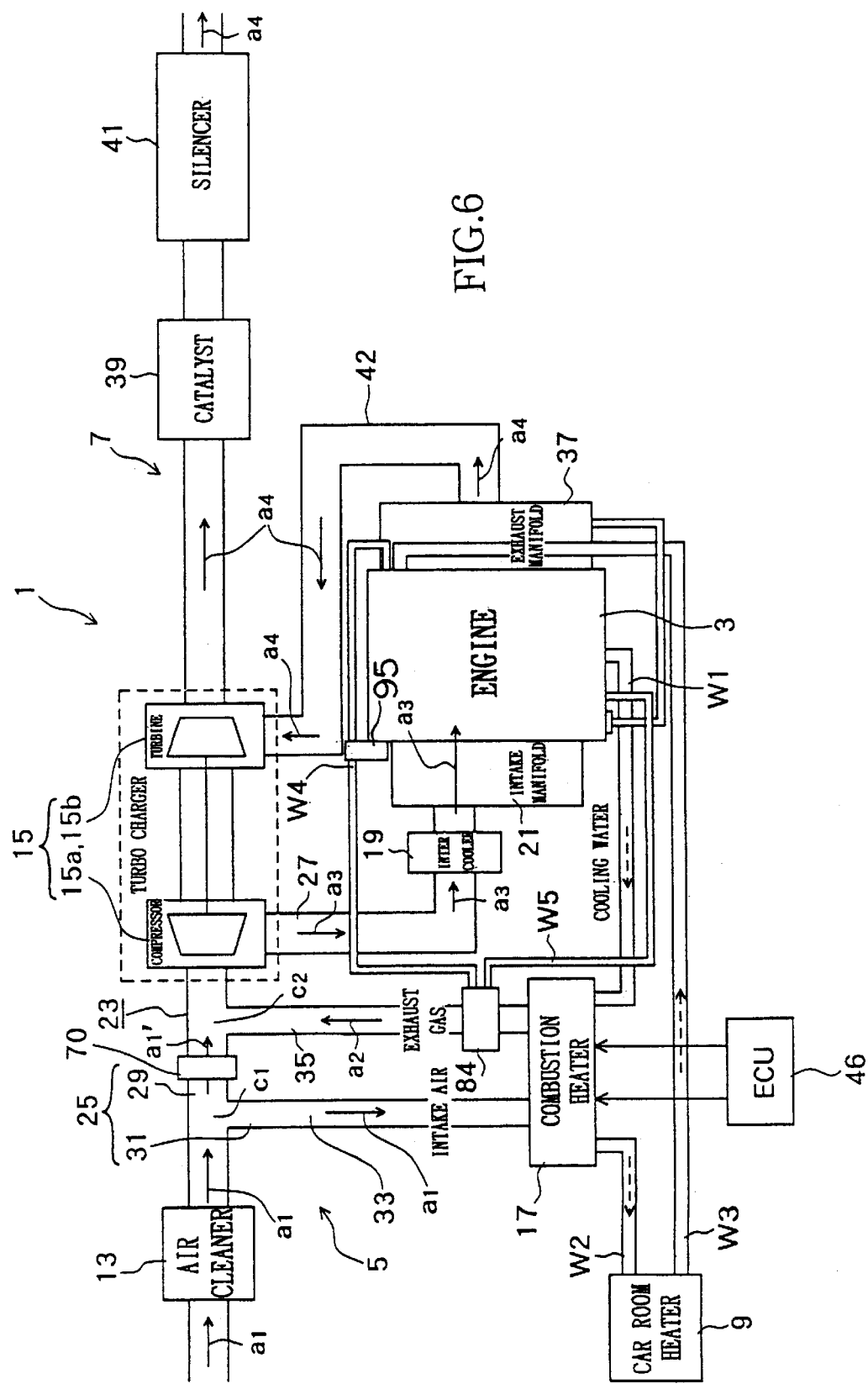
FIG. 6 is a schematic diagram showing an internal combustion engine having the combustion heater in a fourth embodiment.

A fourth embodiment will be described with reference to FIG. 6.

The only difference of the fourth embodiment from the first embodiment is that an oil cooler 95 serving as a heat exchange device is incorporated into the engine body 3 and located at midway of the water conduit W4. In other words, the oil cooler 95 is located downstream of the exhaust gas cooler 84 of the circulating passageway including the water conduits W4 and W5 which connect the water jacket and the exhaust gas cooler 84 serving as a cooling device. Hence, the description is concentrated on only the difference from the first embodiment, and the description of the same components is omitted while marking them with the like reference symbols.

The oil cooler 95 is a cooling device for cooling an engine oil which is an engine lubricating oil in order to keep the performance of this oil itself, separately from cooling the engine, and it takes such a known structure as to cool the engine oil by flowing the engine cooling water around it.

For the purpose of flowing the engine cooling water to the oil cooler 95, it is so arranged that the oil cooler 95 is connected via the water conduit W4 to the exhaust gas cooler 84 and the oil cooler 95 is disposed midway of the water conduit W4 as described above.

(Operation and Effect of the Fourth Embodiment)

The fourth embodiment provides the following operation and effect in addition to the same operation and effect as that of the first embodiment.

The heat received by the engine cooling water from the exhaust gas cooler 84, is transmitted to the engine oil through the oil cooler 95, and the heat held by the engine cooling water is thereby transferred to the engine oil, thus executing the heat exchange. Hence, when it is so arranged that the oil cooler 95 operates during the engine warming-up process in which the engine lubricating oil is still cold, the heat held by the engine cooling water is transmitted to the engine oil and thereby warms the oil, and, therefore, even when trying to decrease the compression ratio of the internal combustion engine, delay of warming the oil can hardly occur during the warming-up process of the internal combustion engine. Thus, since the engine friction decreases, the engine 1 has a high fuel efficiency.

Further, the heat of the combustion gas of the combustion heater 17 is absorbed not only by the exhaust gas cooler 84 but also by the oil cooler 95, thereby the efficiency is improved.

As described above, according to the present invention, the heat transmission fluid is warmed by the combustion heater, and the thus warmed heat transmission fluid serves to enhance the performance of the temperature raising device. Accordingly, the internal combustion engine having the combustion heater according to the present invention, is capable of enhancing the performance of the temperature raising device more greatly than the internal combustion engine not having the combustion heater.

Further, the combustion gas flowing from the temperature raising device through the combustion gas introducing passageway to the internal combustion engine body, has already functioned as the thermal source for the temperature raising device, and, therefore, it is no longer required to be in high temperature. Then, this used-combustion gas is cooled by the cooling device, so that no thermal damages are caused to the structures of the intake system.

Moreover, prevention of the thermal damages to the structures of the intake system can be achieved simply by providing the cooling device, which simplifies the manufacturing work, and, therefore, enhances the productivity of the internal combustion engine having the combustion heater.

Then, at least when starting the internal combustion engine, the combustion gas of the combustion heater flows through the bypass passageway, steering clear of the cooling device, and arrives at the internal combustion engine body, and, therefore, it is the as-warmed gas not cooled by the cooling device. Accordingly, it is feasible to enhance the starting characteristic of the internal combustion engine at the starting, even in the low-temperature state where the internal combustion engine is not yet warmed. Hence, the compression ratio can be decreased.

Furthermore, the heat received by the engine cooling water from the cooling device is transmitted to the lubricating oil of the internal combustion engine by the heat exchange device, whereby the heat held by the engine cooling water is transferred to the lubricating oil. Therefore, even when the compression ratio of the internal combustion engine is decreased, delay of warm-up of the oil can hardly occur when warming up the internal combustion engine. Consequently, the engine friction is reduced, which gives a high fuel efficiency to the internal combustion engine even at the time of starting.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An internal combustion engine having a combustion heater which operates when said internal combustion engine is in a predetermined operating state, and enhancing a performance of a temperature raising device with a heat transmission fluid serving as a thermal source, by warming the heat transmission fluid by the combustion heater, said engine comprising:

a combustion gas introducing passageway, which connects said combustion heater to an intake system of said internal combustion engine, for introducing a combustion gas emitted from said combustion heater into said intake system; and a cooling device for cooling the combustion gas flowing through said combustion gas introducing passageway.

2. An internal combustion engine having a combustion heater according to claim 1, wherein said temperature raising device is a car room heater for raising a temperature within a room of a vehicle.

3. An internal combustion engine having a combustion heater according to claim 1, wherein the heat transmission fluid is an engine cooling water.

4. An internal combustion engine having a combustion heater according to claim 3, wherein said cooling device cools off the combustion gas by radiating the heat held by the combustion gas to the engine cooling water.

5. An internal combustion engine having a combustion heater according to claim 3, wherein said cooling device transmits the heat of the combustion gas of said combustion heater to the engine cooling water via an external wall of the body of said internal combustion engine.

6. An internal combustion engine having a combustion heater according to claim 1, further comprising:

a bypass passageway connected in bypass to said combustion gas introducing passageway with respect to said cooling device; and a passageway switching device for guiding the combustion gas of said combustion heater to said internal combustion engine body via said bypass passageway when the internal combustion engine is in the predetermined operating state and at the time of starting thereof.

7. An internal combustion engine having a combustion heater according to claim 4, further comprising:

a heat exchange device for transmitting the heat received by the engine cooling water from said cooling device to a lubricating oil of said internal combustion engine, and thereby transferring the heat held by the engine cooling water to the lubricating oil.

8. An internal combustion engine having a combustion heater according to claim 7, wherein said heat exchange device is disposed in a circulation passageway for connecting said cooling device to a water jacket of said internal combustion engine provided, at downstream of said cooling device.

9. An internal combustion engine having a combustion heater according to claim 8, wherein said heat exchange device is an oil cooler.

* * * * *